INVENTOR
Cecil P. Rogers

Oct. 13, 1959 C. P. ROGERS 2,908,105
METHOD AND APPARATUS FOR DISPENSING LIVE AQUATIC ANIMALS
Filed Feb. 21, 1956 4 Sheets-Sheet 3

INVENTOR
Cecil P. Rogers
BY
ATTORNEYS

INVENTOR
Cecil P. Rogers

United States Patent Office 2,908,105
Patented Oct. 13, 1959

2,908,105

METHOD AND APPARATUS FOR DISPENSING LIVE AQUATIC ANIMALS

Cecil P. Rogers, Independence, Mo.

Application February 21, 1956, Serial No. 566,855

11 Claims. (Cl. 43—55)

This invention relates to a method and apparatus for dispensing live aquatic animals. More specifically, the invention relates to a method and apparatus for maintaining aquatic animals alive for a substantial period of time and dispensing the animals as desired.

It is a great convenience to anglers in popular fishing areas to provide bait sales stands near the docks, and the availability of live bait, such as minnows, at such stands is especially desirable. Bait vendors frequently maintain minnows alive in large quantities in tanks or minnows buckets. However, they must be dispensed in small measured quantities which necessitates the use of small nets to remove the proper quantity of minnows from the tanks. Such procedure is time consuming, there is much spillage of water, and the obtaining of a reasonably definite number of minnows is difficult. By the use of this invention, minnows or any other type of small aquatic animals may be maintained alive for a long period of time and dispensed in any desired quantity, without the use of nets, directly into the fisherman's minnow bucket or like container. The operation of the device is simple, fast, and efficient. Further, since the operation may be automatic, the fisherman may serve himself at any hour of the day without assistance from an attendant whose attention is required only when the apparatus is empty.

It is a primary object of this invention to provide a new and useful apparatus for dispensing live aquatic animals in which apparatus the animals may be maintained alive and dispensed in individual units of any desired number of animals.

It is an additional object of this invention to provide a dispenser for live aquatic animals which will maintain the animals under aerated water in units each comprising any desired number of animals, which units of animals may be individually dispensed in predetermined order.

It is a further object of this invention to provide a new and useful apparatus for dispensing live aquatic animals comprising a plurality of dispensing units, each of which is adapted to contain a quantity of animals in aerated water, which units may be individually moved to dispensing position where the animals contained therein may be removed.

It is a still further object of this invention to provide a novel method of dispensing live aquatic animals by maintaining the animals alive under water in units of any desired quantity and dispensing the units of animals as desired.

Figure 1:
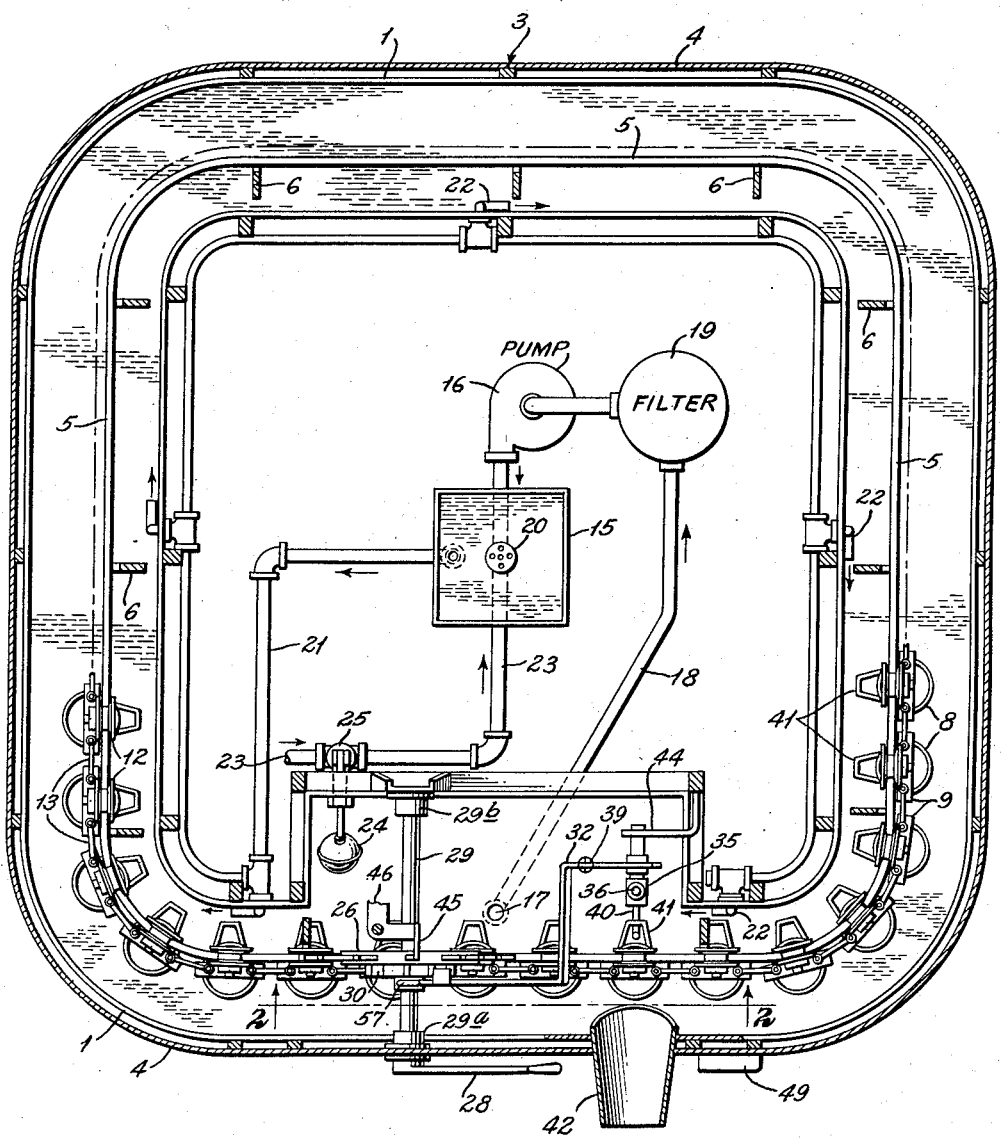
Figure 1 is a plan view partly in section, showing the apparatus of the invention.
Figure 2:
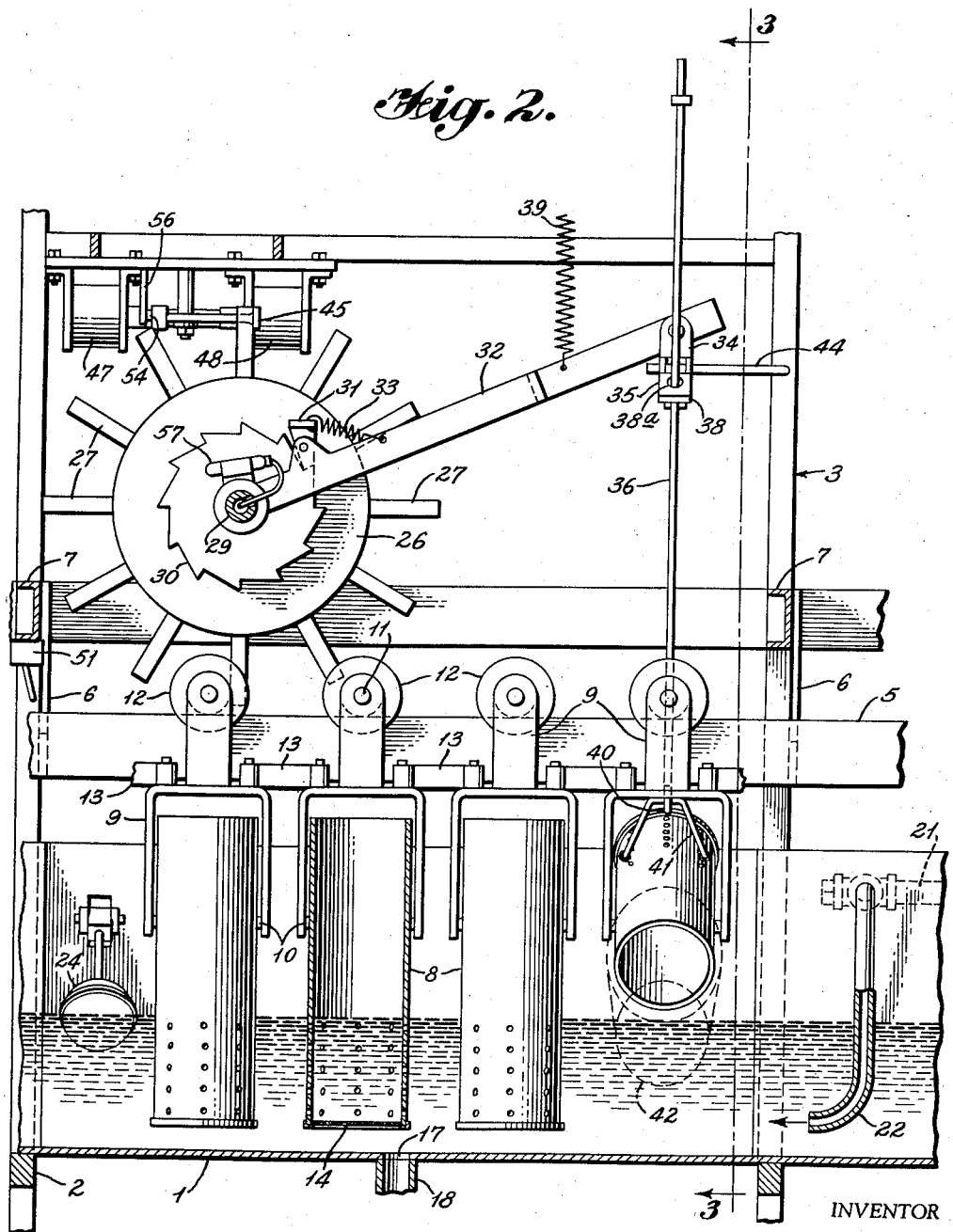
Figure 2 is a fragmentary vertical sectional view taken in the direction of the arrows along the line 2—2 of Figure 1.

There is provided a preferably welded supporting frame indicated generally by the reference numeral 3 which includes a generally annular tank 1, an exterior peripheral face 4, and a plurality of supporting and bracing members shown only to the extent necessary to a full understanding of the invention. The tank may be of any shape but preferably extends around a smooth closed line. There is also provided a track 5 supported by hangers 6 attached to cross members 7 which in turn are attached to the frame 3. The track 5 lies above and extends in an endless line conforming generally to the plan contour of tank 1. Suspended from the track 5 are a plurality of dispensing units comprising receptacles 8, each of which is pivotally secured to a hanger member 9 by means of pin 10 passing through the walls of receptacle 8. Each hanger member 9 is in turn connected by means of an axle 11 to a trolley wheel 12 which is mounted on track 5 to roll thereon. The receptacles 8 are connected together in a line by means of links 13. Thus a force applied longitudinally of the track 5 to the assembly including receptacles 8, hanger members 9, pin 10, axles 11 and trolley wheels 12 will impart movement around the track 5 to all of the receptacles 8.

The tank 1 may be filled with water to a level sufficiently above the bottom of receptacles 8 to permit a quantity of minnows to swim freely therein. Each receptacle 8 has perforated walls defining a water receiving chamber capable of confining the minnows while permitting water to flow freely therethrough. Thus in the dispensing units, the minnows may be maintained alive under water in separate numerical units, each consisting of any desired quantity of minnows. The receptacles are also provided with wire mesh bottoms 14. It is to be understood, however, that the receptacles may be formed entirely of wire mesh. An aeration chamber 15 is provided to aerate the water in tank 1. A pump 16 which may be any suitable type such as a rotary pump is provided to move water to aeration chamber 15 from outlet 17 in tank 1, through conduit 18 and filter 19 of any suitable type to remove any impurities suspended in the water. The filtered water is sprayed upwardly into aeration chamber 15 through spray nozzle 20, and descends by gravity into the bottom of the chamber. From the aeration chamber 15 the water flows by gravity through conduit 21 and is injected into tank 1 through nozzles 22 which are all pointed in the same direction parallel to the walls of tank 1 to cause the water to circulate around the tank. Additional water from any suitable source may be added to the system through conduit 23 which is connected to aeration chamber 15. The flow of additional water is controlled according to the level of water in tank 1 by means of float 24 which operates valve 25 in conduit 23. Thus, aerated water is continuously circulated through each of the receptacles 8 and additional water is added to the system whenever the level in tank 1 descends past the critical point by reason of the opening of float controlled valve 25.

The receptacles 8 are selectively moved around the tank 1 by means of indexing wheel 26, which is rotatably mounted on shaft 29. The longitudinal axis of the shaft 29 is normal to the longitudinal axis of track 5 and the indexing wheel 26 is mounted directly above track 5. Indexing wheel 26 has a plurality of evenly spaced radial extensions 27 which extend across and operatively engage the hubs of trolley wheels 12. Thus upon rotation of indexing wheel 26, movement is imparted to trolley wheels 12 which carry receptacles 8 longitudinally around track 5. Shaft 29 is journaled for rotation in bearings 29a and 29b which are attached to frame 3. At the exterior end of shaft 29, which extends through peripheral face 4, is rigidly attached an operating handle 28 which may be manually operated to impart rotation to the shaft 29. Also rigidly attached to shaft 29 at a position adjacent to indexing wheel 26 is lifting lever 32. A ratchet wheel 30 is attached to the side of indexing wheel 26 adjacent lifting lever 32 and is operatively engaged by pawl 31 which is pivotally connected to lifting lever 32. Pawl 31 is held in engagement with ratchet wheel 30 by means of spring 33 which is connected to and extends between pawl 31 and lifting lever 32. Upon downward movement of operating handle 28, shaft 29 is rotated and lifting lever 32 is moved downwardly. Pawl 31 engages ratchet wheel 30 and rotation is imparted to indexing wheel 26. The downward stroke of operating handle 28 is so adjusted that one such stroke will rotate indexing wheel 26 to the extent necessary to move trolley wheels 12 along track 5 a distance equal to the spacing between adjacent receptacles 8. Extending between and connected to frame 3 and lifting lever 32 is a spring 39 which upon release of operating handle 28 exerts an upward pull on lifting lever 32 to move both handle 28 and lever 32 to their original uppermost positions.

Pivotally connected near the outer end of lifting lever 32 is a link 34 to which in turn is pivotally connected detent 35 having an inclined flange 38 with a hole 38a extending therethrough. Located at the dispensing station is lifting rod 36 which extends downwardly through hole 38a. Upon downward movement of lifting lever 32, the drag of lifting rod 36 against the edge of hole 38a causes detent 35 to rotate in a clockwise direction. This releases the grip of the edges of hole 38a from lifting rod 36 and detent 35 slides freely downwardly along lifting rod 36. However, upon upward movement of lifting lever 32, the drag of lifting rod 36 against the edge of hole 38a causes detent 35 to rotate in a counter-clockwise direction and lifting rod 36 is gripped between the opposite sides of hole 38a and is moved upwardly with detent 35. The hooked end 40 of lifting rod 36 engages handle 41 rigidly mounted on the receptacle 8 which is immediately adjacent the dispensing station. Continued movement of lifting rod 36 imparts rotation to receptacle 8 about pin 10 and the minnows therein are poured into inclined tube 42 extending through peripheral wall 4. A suitable receptacle may be held beneath tube 42 to receive the minnows. Shortly before lifting lever 32 reaches the end of its upward stroke, extension 43 on detent 35 engages stop 44 which is attached to frame 3. Detent 35 is thus rotated about its mounting in a clockwise direction to release lifting rod 36 which descends once again to its lowermost position.

Figure 3:
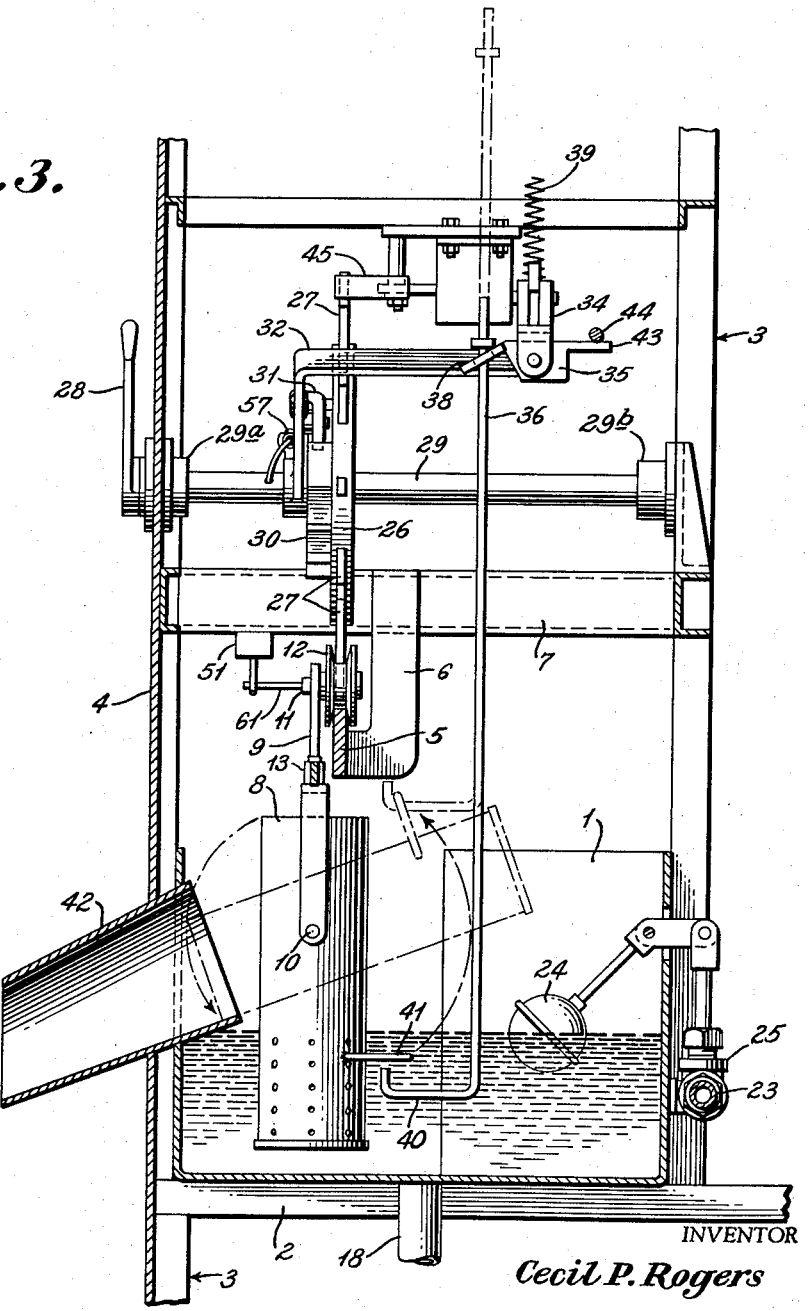
Figure 3 is a vertical sectional view taken in the direction of the arrows along the line 3—3 of Figure 2.
Figure 4:
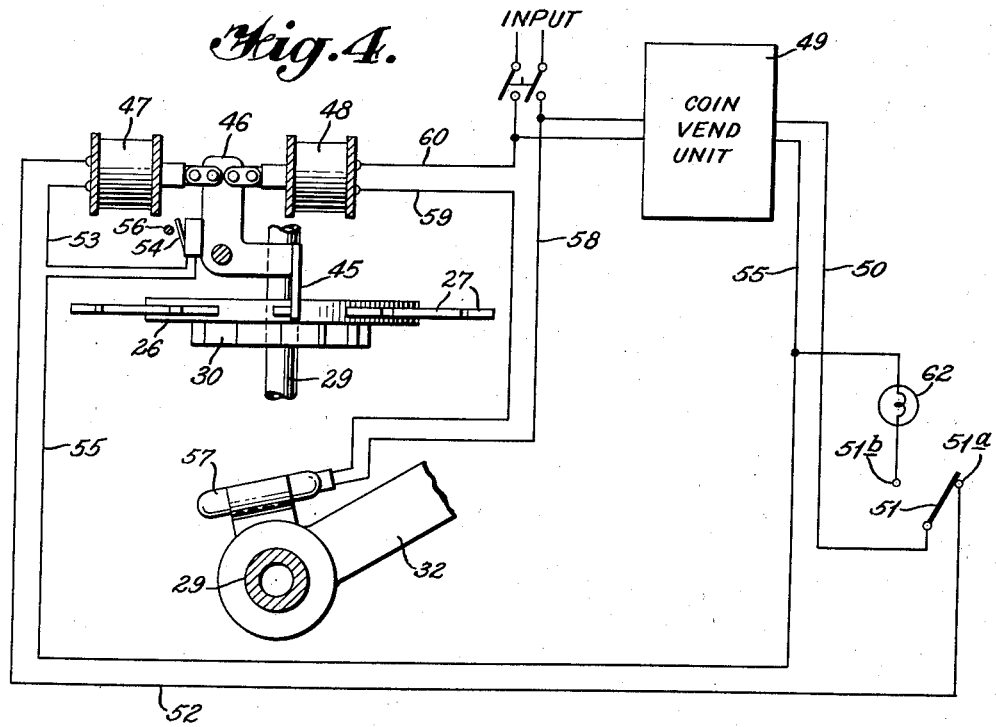
Figure 4 is a schematic diagram of the electric circuit embodied in the apparatus of the invention.
Figure 5:
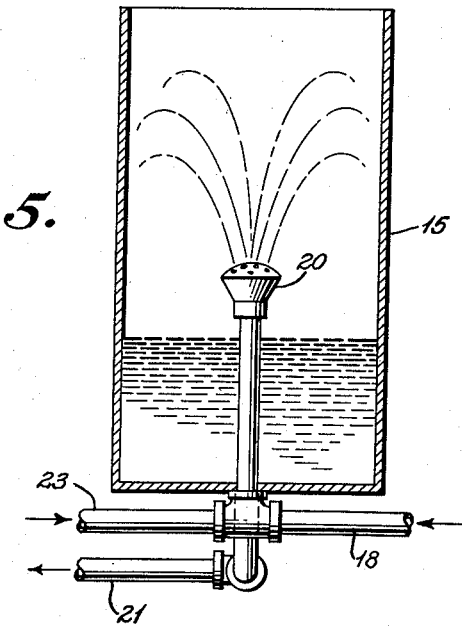
Figure 5 is a vertical sectional view showing the aerating device used in connection with the invention.

The apparatus of the invention includes an automatic control system for the dispensing mechanism shown diagramatically in Figure 4. There is provided a locking bar 45 which engages the adjacent radial extension 27 of indexing wheel 26. The locking bar 45 is mounted on the end of bell crank 46 which is pivotally mounted on frame 3. The locking bar 45 is moved to the unlocked position by means of an unlocking solenoid 47 and is moved to the locked position by means of a locking solenoid 48. The solenoids are controlled by a coin vend unit 49. When a coin is inserted, a circuit is momentarily closed from any suitable source of electricity through line 50, switch 51, line 52, unlocking solenoid 47, line 53, normally closed micro-switch 54 and line 55. The operation of unlocking solenoid 47 imparts counter-clockwise rotation to bell crank 46 and moves locking bar 45 out of the path of the radial extensions 27 of indexing wheel 26. Upon completion of the stroke of unlocking solenoid 47, micro-switch 54 is opened by reason of its engagement with stop 56 to open the unlocking circuit. A dispensing cycle may then be initiated by manual operation of operating handle 28 to rotate shaft 29 in a clockwise direction. This results in the closing of mercury switch 57, which is mounted on shaft 29, to actuate the locking circuit. Current flows from the source of electricity through line 58, mercury switch 57, line 59, locking solenoid 48, and line 60. The operation of the locking solenoid 48 imparts clockwise rotation to bell crank 46 and moves locking bar 45 into the path of radial extensions 27 of indexing wheel 26 to prevent the initiation of another dispensing cycle. The armature of switch 51 during the operation of the invention is maintained against contact 51a but when the last receptacle 8 to be emptied is moved to the dispensing position, the armature of switch 51 is automatically moved against contact 51b by a rod 61 which is shown in Figure 3 is welded to the hanger member 9 of one of the receptacles 8. This prevents the operation of the unlocking circuit and establishes a circuit through signal light 62 which indicates that the machine is empty and must be refilled. When the receptacles 8 are refilled, the armature of switch 51 may be manually moved against contact 51a to again permit operation of the unlocking circuit.

The operation of the invention through a complete cycle will now be briefly described: When a coin is inserted in coin vend unit 49, an electric circuit is completed through unlocking solenoid 47 and locking bar 45 is removed from the path of radial extensions 27 of indexing wheel 26. Operating handle 28 may then be moved downwardly to rotate shaft 29, move lifting lever 32 downwardly, and impart rotation to indexing wheel 26. The line of minnow receptacles 8, each containing a unit of one or more minnows, is moved along track 5 and a full receptacle 8 is moved to the dispensing position. As operating handle 28 descends and shaft 29 is rotated, mercury switch 57 is closed to actuate the locking solenoid 48 which moves locking bar 45 into the path of radial extensions 27 to prevent further rotation of the indexing wheel 26. Further, as lifting lever 32 descends, detent 35 slides freely downwardly along lifting rod 36. Upon release of operating handle 28, lifting lever 32 begins to rise, due to the force exerted by spring 39. Detent 35 engages lifting rod 36 to move it upwardly and the hooked portion 40 engages handle 41 of the receptacle 8 which is adjacent the dispensing position to tip the receptacle and dump its minnow unit into tube 42. When lifting lever 32 nears the top of its stroke, extension 43 of detent 35 engages stop 44. This releases lifting rod 36 which drops to its lowermost position. The apparatus is now ready for another cycle. Throughout the entire operation, the water in the tank which flows through the receptacles is continuously aerated and circulated, thus assuring that the minnows may be kept alive for a substantial period of time.

The invention has been described in connection with the dispensing of minnows. It will be understood, however, that the invention may be used to dispense shrimp, crabs, goldfish, or any other type of small aquatic animal.

There has been illustrated and described what is considered to be the preferred embodiment of the invention. It will be understood, however, that various modifications may be made without departing from the broader scope of the invention as described by the following claims.

I claim:

1. In an apparatus for dispensing live aquatic animals, a tank, an assembly including a plurality of connected dispensing units positioned in said tank, each of said units having a water receiving chamber adapted to confine at least one of said animals, said tank being adapted to contain water to a level above the bottom of said chambers, said units being provided with means to admit water from said tank into said water-receiving chambers, means engageable with said assembly to move said units in a predetermined order past a dispensing station, and means positioned at said dispensing station sequentially to remove said units from the water-containing portion of said tank to dispense the animals from said units at said dispensing station.

2. In an appartus for dispensing live aquatic animals, a tank, an assembly including a plurality of connected dispensing units positioned in said tank, each of said units having a water receiving chamber adapted to confine at least one of said animals, said tank being adapted to contain water to a level above the bottom of said chambers, said units being provided with means to admit water from said tank into said water-receiving chambers, means in fluid communication with said tank to aerate the water in said tank, means to move said units in a predetermined order past a dispensing station, and means positioned at said dispensing station sequentially to remove said units from the water-containing portion of said tank to dispense the animals from said units at said dispensing station.

3. In an apparatus for dispensing live aquatic animals, a tank, an assembly including a plurality of connected dispensing units in said tank, each of said units having perforated wall means defining a water receiving chamber adapted to confine at least one of said animals, said tank being adapted to contain water to a level above the bottom of said chambers, means engageble with said assembly to move said units in a predetermined order past a dispensing station, and means positioned at said dispensing station sequentially to remove said units from the water-containing portion of said tank to dispense the animals from said units at said dispensing station.

4. In an apparatus for dispensing live aquatic animals, a tank, an assembly including a plurality of connected dispensing units in said tank, each of said units having perforated wall means defining a water receiving chamber adapted to confine at least one of said animals, said tank being adapted to contain water to a level above the bottom of said chambers, means in fluid communication with said tank to aerate the water in said tank, means engageable with said assembly to move said units in a predetermined order past a dispensing station, and means positioned at said dispensing station sequentially to remove said units from the water-containing portion of said tank to dispense the animals from said units at said dispensing station.

5. In an apparatus for dispensing live aquatic animals, a tank, an assembly including a plurality of connected perforated receptacles, each receptacle being adapted to confine at least one of said animals, means to movably support said receptacles in said tank, said tank being adapted to contain water to a level above the bottom of said receptacles, means in fluid comunication with said tank to aerate the water in said tank, means engageable with said assembly to move said receptacles in a predetermined order past a dispensing station and means positioned at said dispensing station sequentially to remove said receptacles from the water-containing portion of said tank and to dispense the animals from said receptacles at said dispensing station.

6. In an apparatus for dispensing live equatic animals, a tank, a track, means to support said track above the bottom of said tank, an assembly including a plurality of perforated receptacles positioned in said tank and movably connected to said track and means connecting said receptacles in a line, each of said receptacles being adapted to confine at least one of said animals, said tank being adapted to hold water to a level above the bottom of said receptacles, means engageable with said assembly to move said receptacles along said track past a dispensing station, and means positioned at said dispensing station sequentially to remove said receptacles from the water-containing portion of said tank and to dispense the animals from said receptacles at said dispensing station.

7. In an apparatus for dispensing live aquatic animals, a water-containing tank, a track, means to support said track above the bottom of said tank, an assembly including a plurality of perforated receptacles, each adapted to confine at least one of said animals, link means connecting said receptacles in a line, and a plurality of members movably connected to said track and pivotally supporting said receptacles in the water-containing portion of said tank, means in fluid communication with said tank to aerate the water in said tank, means engageable with said assembly to move said receptacles around said track past a dispensing station, and means positioned at said dispensing station to lift the receptacle adjacent said dispensing station out of the water-containing portion of said tank and to remove the animals therefrom.

8. In an apparatus for dispensing live aquatic animals, a generally annular tank, an endless track extending around said tank and supported above the bottom thereof, an assembly including a plurality of perforated receptacles positioned in said tank, and each adapted to confine at least one of said animals, link means connecting said receptacles in a line, and a plurality of connector members pivotally supporting said receptacles and movably connected to said track, said tank being adapted to contain water to a level above the bottom of said receptacles, means in fluid communication with said tank to aerate the water in said tank, said aerating means including including outlets tangentially disposed in said tank to circulate the water around said tank, means engageable with said assembly to move said receptacles around said track past a dispensing station, and means positioned at said dispensing station to lift the receptacle adjacent said dispensing station out of the water-containing portion of said tank and to remove the animals therefrom.

9. An apparatus for dispensing live aquatic animals comprising a water-containing tank, an assembly including a plurality of interconnected dispensing units positioned in said tank, each of said units defining an animal-confining chamber in fluid communication with said tank, means connectable to said assembly to move said units along a pre-determined path past a dispensing station, and means positioned at said dispensing station sequentially to empty the contents of each of said chambers while it is adjacent said dispensing station.

10. An apparatus for dispensing live aquatic animals which comprises a frame including a water-containing tank, an assembly including a plurality of interconnected perforated animal-confining receptacles each pivotable about a horizontal axis, said assembly being movably connected to said frame to permit said receptacles to be moved along a closed path with the lower portions of said receptacles being positioned in the water-containing portion of said tank, an operating wheel rotatably supported by said frame and including means for engaging said assembly intermittently to move said receptacles along said closed path and sequentially to position each receptacle at a dispensing station, means carried by said frame for releasably restraining said operating wheel against rotation, an actuating member movably supported by said frame at said dispensing station for pivoting each receptacle about the horizontal axis while it is positioned at the dispensing station to dispense the contents thereof, and means supported by said frame for operating said actuating member.

11. The apparatus of claim 10 wherein said operating wheel is intermittently rotated in response to the means for operating said actuating member.

References Cited in the file of this patent

UNITED STATES PATENTS

| | | |
|---|---|---|
| 2,007,479 | Salles et al. | July 9, 1935 |
| 2,738,547 | Zebarth | Mar. 20, 1956 |
| 2,767,507 | Chiambretti | Oct. 23, 1956 |